United States Patent [19]

Fuchs et al.

[11] Patent Number: 5,526,576
[45] Date of Patent: Jun. 18, 1996

[54] COORDINATE MEASUREMENT MACHINE HAVING A PROBE HEAD AND AN ELECTRONIC SYSTEM FOR PROCESSING PROBE SIGNALS

[75] Inventors: Anton Fuchs; Eugen Aubele, both of Böhmenkirchen; Rudi Kern, Aalen; Rudolf Rögele, Konigsbronn; Walter Puntigam, Groskuchen; Karl-Eugen Aubele, Geislingen, all of Germany

[73] Assignee: Carl-Zeiss-Stiftung, Heidenheim (Brenz), Oberkochen, Germany

[21] Appl. No.: 304,709

[22] Filed: Sep. 12, 1994

[30] Foreign Application Priority Data

Sep. 13, 1993 [DE] Germany .................. 43 30 873.2

[51] Int. Cl.⁶ ............................................... G01B 5/03
[52] U.S. Cl. ...................................... 33/503; 33/556
[58] Field of Search ............... 33/1 M, 503, 504, 33/505, 556, 557, 558.3, 559, 560

[56] References Cited

U.S. PATENT DOCUMENTS

| | | | |
|---|---|---|---|
| 4,677,755 | 7/1987 | Iwano et al. | 33/503 |
| 4,819,195 | 4/1989 | Bell et al. | 33/505 |
| 4,942,545 | 7/1990 | Sapia | 33/504 |
| 4,991,304 | 2/1991 | McMurtry | 33/1 M |
| 5,090,131 | 2/1992 | Deer | 33/559 |
| 5,150,529 | 9/1992 | Collingwood | 33/503 |

FOREIGN PATENT DOCUMENTS

| | | |
|---|---|---|
| 0388993 | 9/1990 | European Pat. Off. |
| 0501680 | 2/1992 | European Pat. Off. |
| 0556574 | 8/1993 | European Pat. Off. |
| 2172707 | 9/1986 | United Kingdom . |
| 8701798 | 3/1987 | WIPO . |

OTHER PUBLICATIONS

Proc. 8th. Int. Conf. Automated Inspection and Product Control pp. 225–240, 1987.
Carl Hanser Verlag, Munich 1991, pp. 26–30 entitled, "Development of a Small Novel 3–Dimensional High Accuracy . . . ".

*Primary Examiner*—William A. Cuchlinski, Jr.
*Assistant Examiner*—G. Bradley Bennett
*Attorney, Agent, or Firm*—Hopgood, Calimafde, Kalil & Judlowe

[57] ABSTRACT

The electronic system (20) of the probe head of a coordinate measuring machine permits the digital setting of parameters which determine the nature and manner of signal processing, such as trigger levels, the characteristic of frequency filters, and time intervals between several coherent probe signal pulses. Different parameter combinations are stored together in data files which can be called up in accordance with the selected measurement task or in accordance with the probe configuration which has been installed in probe head.

32 Claims, 5 Drawing Sheets

```
File :       Standard. ST3

Probe No.              :        ▭
Parameter
NIM 1 — Trigger Level  :        ▭
NIM 2 — Trigger Level  :        ▭
MESK — Trigger Level   :        ▭
Mode of Operation      :        ▭
NIM 1 — NIM 2 — F      :        ▭
NIM 2 — MESK — F       :        ▭
MESK — MECHK — F       :        ▭
High Pass Filter       :        ▭
Band Pass Filter       :        ▭
```

FIG. 4

```
Dir     *.ST3
Standard.ST3
Light   ST3
Heavy   ST3
Long    ST3
Special 1.ST3
Special 2.ST3
Precise ST3
Fast    ST3
```

COORDINATE MEASUREMENT MACHINE HAVING A PROBE HEAD AND AN ELECTRONIC SYSTEM FOR PROCESSING PROBE SIGNALS

BACKGROUND OF THE INVENTION

The present invention relates to a coordinate measurement machine having a probe head with associated replaceably interchangeable probes and an electronic system for processing signals produced in the course of a workpiece-probing procedure, wherein the electronic system permits parameters to be set for determining the nature and manner of signal processing.

Such a coordinate-measurement machine is sold by applicants' assignee under the designation MC. This machine has a displaceable probe head with a so-called switching type probe which, pursuant to its workpiece-contacting procedure, produces two successive signals; the first or so-called piezo signal is produced by piezoelectric sensors in the probe pin at the instant of contact with a workpiece. In the course of further probe-head movement, the probe pin is deflected and a second, so-called contact signal, is produced; this second signal is produced when a resiliently mounted carrier for the probe pin is deflected from its position of rest, thereby opening contacts of an electromechanical switch integrated in the mounting of the probe-pin carrier.

The signals of this switching-type probe head have heretofore been evaluated substantially in accordance with a fixed scheme. There is only a limited possibility of adapting the evaluation to changed surrounding conditions. For example, by turning a screw on the housing of the probe head, the operator can adjust the sensitivity of the amplifier for the piezo signal. In automatic CNC programs, the sensitivity of the evaluation is determined by this adjustment, even though it is not optimal for all probe configurations that are replaced or interchanged in the course of a given measurement, or for all measurement tasks. Thus, to adapt a given coordinate measuring machine to different fields of use, as for example, for use in manufacture under rough surrounding conditions, special circuit boards are provided which contain filters for a probe signal which is optimally adapted to this use. If new machines are developed, the components of the evaluation electronics must also be adapted. In this way, inventory-stocking cost increases with each new variant of the machine.

Furthermore, despite these measures, there are cases or measurement tasks in which electronic circuitry within the probe head does not supply an unequivocal, i.e., a valid, work-contact signal, as for example, when soft materials are to be contacted at a relatively slow speed of workpiece contact.

International Patent Application, Publication No. WO 87/01798, describes a coordinate-measurement machine with replaceable probe heads of different types. In that case, the replaceable probe heads are individually coded, so that upon substituting one probe head for another, the code of the probe carried by the newly substituted probe head is electronically recognized and the newly substituted probe is connected to its correct interface, there being several interfaces between which switching can be effected. The interfaces contain electronic circuitry for further processing the probe-head signals. In this connection, however, switching is effected between complete, hard-wired interfaces, and there is no disclosure of any way to adapt probe-signal processing of an interchanged probe head to different measurement tasks or surrounding conditions.

EP 0,501,680 describes an electronic system for processing the signals of a probe head which has a switch circuit for monitoring internal resistance of the mechanical contact which opens to produce the probe signal. The circuit automatically adapts the contact resistance, which becomes greater as a result of aging or use, to a fixed trigger level for the signal. However, there is no provision for externally controlled adjustment of the trigger threshold together with other parameters.

EP 0,388,993 describes an electronic system which automatically recognizes the introduction of probe heads of different type. This circuit sets up window comparators or their trigger level for the probe signal in case of high travel speeds, and as a result, the circuit becomes less sensitive. This publication also fails to disclose an adjustment which is switchably controlled from the outside, along with other parameters.

BRIEF STATEMENT OF THE INVENTION

The object of the present invention is, in a coordinate measurement machine of the character indicated, to provide electronic circuitry for processing of probe-head signals in such manner that they are, with the simplest possible means and at all times, optimally adapted to the measurement task in question.

The invention achieves this object by providing an electronic system (20) for processing signals generated during the probing procedure, wherein the electronic system (20) permits parameters to be set for determining the manner and nature of signal processing. The parameters can be set digitally, and at least one set of values of different parameters is stored in a date file (*.ST3) which can be called up in accordance with the selected measurement task.

The solution of the invention has various advantages: Since the combination of parameters which is optimal for each desired measurement task is stored and the parameters or components can be digitally set in the electronic system, these parameters can be adjusted simply and rapidly. This is particularly advantageous in the case of automatic measurement runs. For example, parameter-data files associated with various replaceable probe configurations, or probe-head data files associated with various replaceable probe heads, are contained in computer-accessible storage, such that upon substitution of a newly installed probe configuration or probe head, the set of parameters appropriate for the particular use of the newly substituted probe configuration or probe head can be automatically computer-loaded into the electronic system. For example, the association of the data files with a newly substituted probe pin, may occur by having the operator, upon calibration of the probe pin, select the corresponding data file from a computer display, to then connect the selected data file to the address of the probe pin.

The system is furthermore very user-friendly since a large number of different parameters need not be individually set by the operator, but he can operate with a few data files which have been predefined; for example, on the work side for given measurement tasks or probes, the optimal value combination of the parameters can have been already established in the data files. Thus, also by way of example, different data files can be provided, on the one hand for the most-precise possible measurement with relatively low travel and contacting speeds and, on the other hand, for less-precise measurement using high travel and contacting speeds. For these two cases, different signal forms of contact signal are produced, and in each case, either different parameters for signal evaluation are evaluated optimally, or the contact signal is evaluated in a different mode of operation.

The setting of parameters specific to each selected probe configuration, or the setting of parameters specific to each selected type of probe head, can be effected completely automatically if, for example, an identifiable code is associated with the probe configuration to be substituted or with the probe head to be substituted. The selection or preselection of the correct parameter-data files, and also (if desired) the subsequent setting of stored parameter-data values in the electronic system, can then be effected under code-identified control.

Furthermore, it is possible to automate the selection of the most suitable parameter-data files and possibly the setting of individual parameters, referred to the workpiece; thus, in a trial run, the signals of the probe head may be recorded (i.e., during the trial run) and evaluated by a suitable program module or firmware module of a corresponding processor and processors. This can be done, for example, by having the program module or firmware module analyze the course of the signal with respect to frequency, amplitude, succession in time, etc.; and, from such an analysis, the program module or the firmware module can develop and propose the most suitable combination of parameters, either as a proposal to the operator or for automatically adopting and storing this most suitable combination. Another possibility is so to program the module that the surface of the workpiece is contacted several times with different parameter settings, so that then a selection can be made for the setting which gives best results. In both cases, the parameter combination which is optimal with respect to the specific measurement task is selected, and it will be understood that measurement of a given type of workpiece is part of the measurement task.

Not only can the sensitivity of the setting of the probe signal be changed, for example via various levels of trigger circuits, but an entire series of stored further parameters such as the characteristics of frequency filters, or signal durations, or time intervals between individual probe-signal pulses, can also be changed. Thus, the probe signal can be reliably generated even under poor surrounding conditions and for unusual measurement tasks.

BRIEF DESCRIPTION OF THE DRAWINGS

Other advantages of the invention will become evident from the following description of a preferred embodiment, in conjunction with the accompanying drawings, in which.

DETAILED DESCRIPTION

Figure 1:
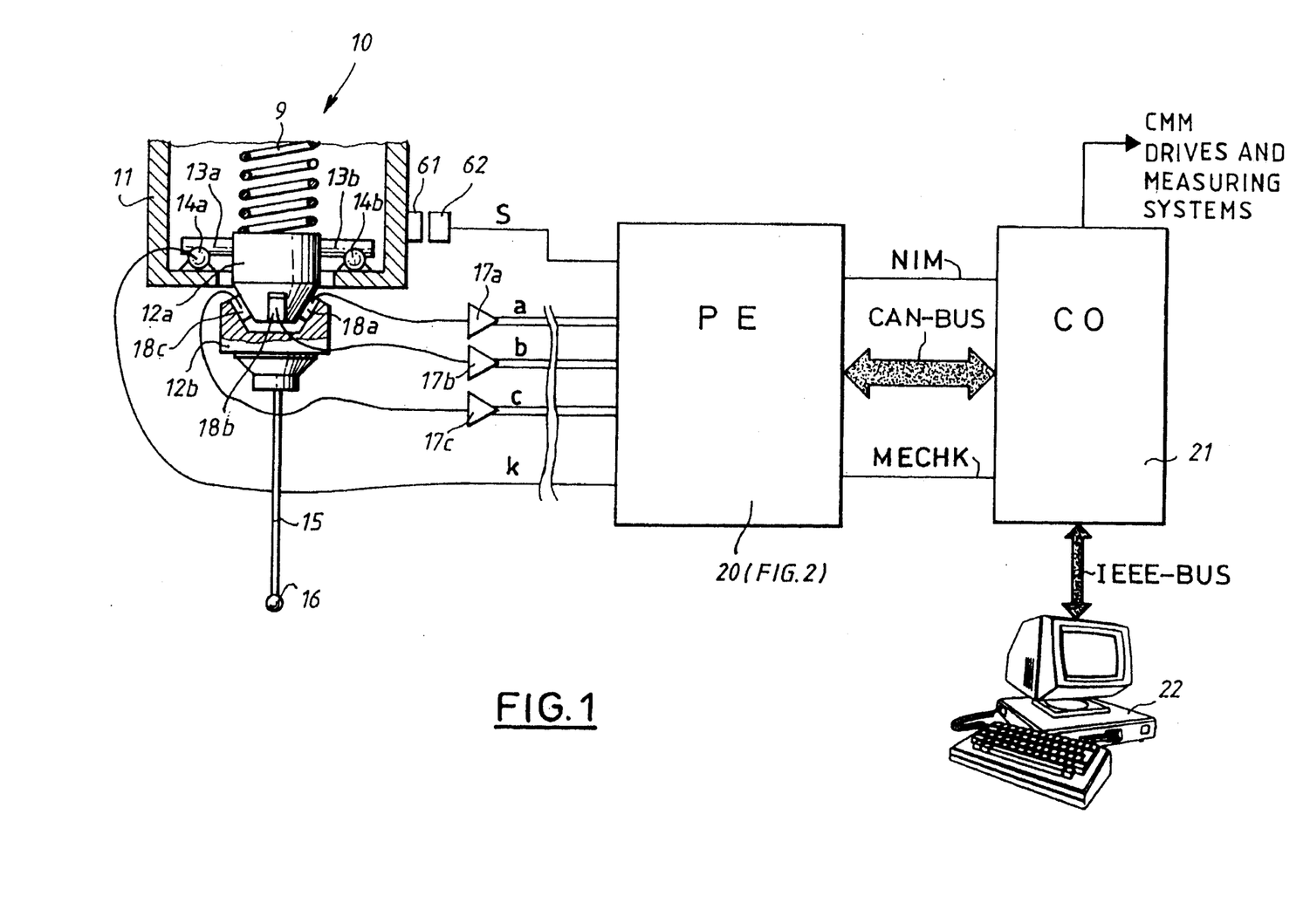
FIG. 1 is a basic diagram of important parts of a probe system and of an associated electronic system, shown connected to relevant parts of a coordinate-measurement machine.

In the basic diagram shown in FIG. 1, 10 designates the probe head of a coordinate measurement machine (CMM), which will be understood to have multiple-coordinate drives for controlled displacement and positioning of probe head 10 within the displacement volume of the CMM machine. The probe head 10 has a cylindrical housing 11 within which a movable carrier 12a, 12b for a probe pin 15 is seated in its rest position. Seating for the rest portion is via three cylindrical pins 13a, 13b, and 13c (not shown), arranged 120° apart, on pairs of balls 14a, 14b and 14c (not shown) in housing 11; the drawing shows only the visible two of the three cylindrical pins and only visible balls of two of the three pairs of balls. A spring 9 resiliently loads the movable carrier 12a, 12b into the three-point support formed by the three pairs of balls. In the course of a workpiece-contacting procedure, probe pin (15) contact with the workpiece causes the carrier 12a, 12b to lift off at least one of the pin/ball-pair engagements. In the at-rest condition shown, the three pairs of balls (14a–c) and the three cylindrical pins form a normally closed electrical switch in an electric circuit, and this switch is opened upon contact with the workpiece.

The resiliently movable probe-pin carrier comprises two separable parts 12a, 12b in coaxially nested relation; and between these two parts are three piezoelectric sensors 18a, b, and c, also 120° apart. Any of these sensors will produce an electric signal, in the event of even the slightest contact the probe ball 16. The probe head 10 which has thus far been described is known per se and is sold by applicants' assignee under the name "switching probe head" (ST) for use on the assignee's coordinate measurement machines.

A signal line k from the electromechanical switch formed by the cylindrical pins 13 and pairs of balls 14 is connected to a probe-head electronic system 20 which may be located on one of the displaceable measurement carriages of the coordinate measurement machine, which need not be shown in further detail. Also connected to this probe-head electronic system is a signal line S, for code reader 62 which recognizes from a code generator 61 associated with probe head 10, the kind or class of probe head to which the currently installed probe head 10 belongs.

Signals generated by any one or more of the three sensitive piezoelectric sensors 18a, 18b, 18c are fed to the electronic system 20, via separate lines having separate preamplifier stages 17a, 17b and 17c; these preamplifier stages will be understood to be contained within the probe-head housing 11. Outputs of the preamplifiers are ungrounded to provide push-pull signals to electronic system 20 via pairs of signal lines a, b and c, for differential measurement-value transmission to the probe-head electronic system 20.

The probe-head electronic system 20 is connected, in its turn, for instance via a so-called CAN-bus, i.e., a high-speed bidirectional, serial two-wire bus, to control means 21 of the coordinate measurement machine. Via this bus, two microprocessors in the probe-head electronic system 20 and in the control means 21 can communicate with each other in both directions. The control means 21 will also be understood to receive measurement signals from linear-measurement systems of measurement carriages of the CMM and to control the associated CMM drives; this part of the electronic system 20 need not be discussed in detail, it being sufficient only to establish that connections exist for probe signals processed or delivered by the probe-head electronic system 20. In FIG. 1, connections are provided by two signal lines designated NIM and MECHK. The signal on signal line NIM to the control means 21 is derived, in a manner described below, primarily from the piezoelectric sensors 14; this derived signal represents the actual contact signal and serves to retain (i.e., freeze) counter readings of the multiple-coordinate linear measurement systems of the CMM. On the other hand, the signal on signal line MECHK to the control means 21 is obtained in a manner described below, from any opening of the switch contacts 13/14 and serves to confirm the validity of the contacting process and/or to report a workpiece-contact deflection of the probe pin or a collision, and to stop or switch the drives of the CMM, so that the probe head can move freely again.

Control means 21 is connected to the computer 22 of the coordinate measurement machine, for example, via a slower parallel, so-called IEEE-bus. Via this bus, the control means receives such data from the computer as are necessary for the course of the measurement and forwards to the computer, inter alia, measurement values supplied by the length-measurement systems of the CMM.

Figure 2:
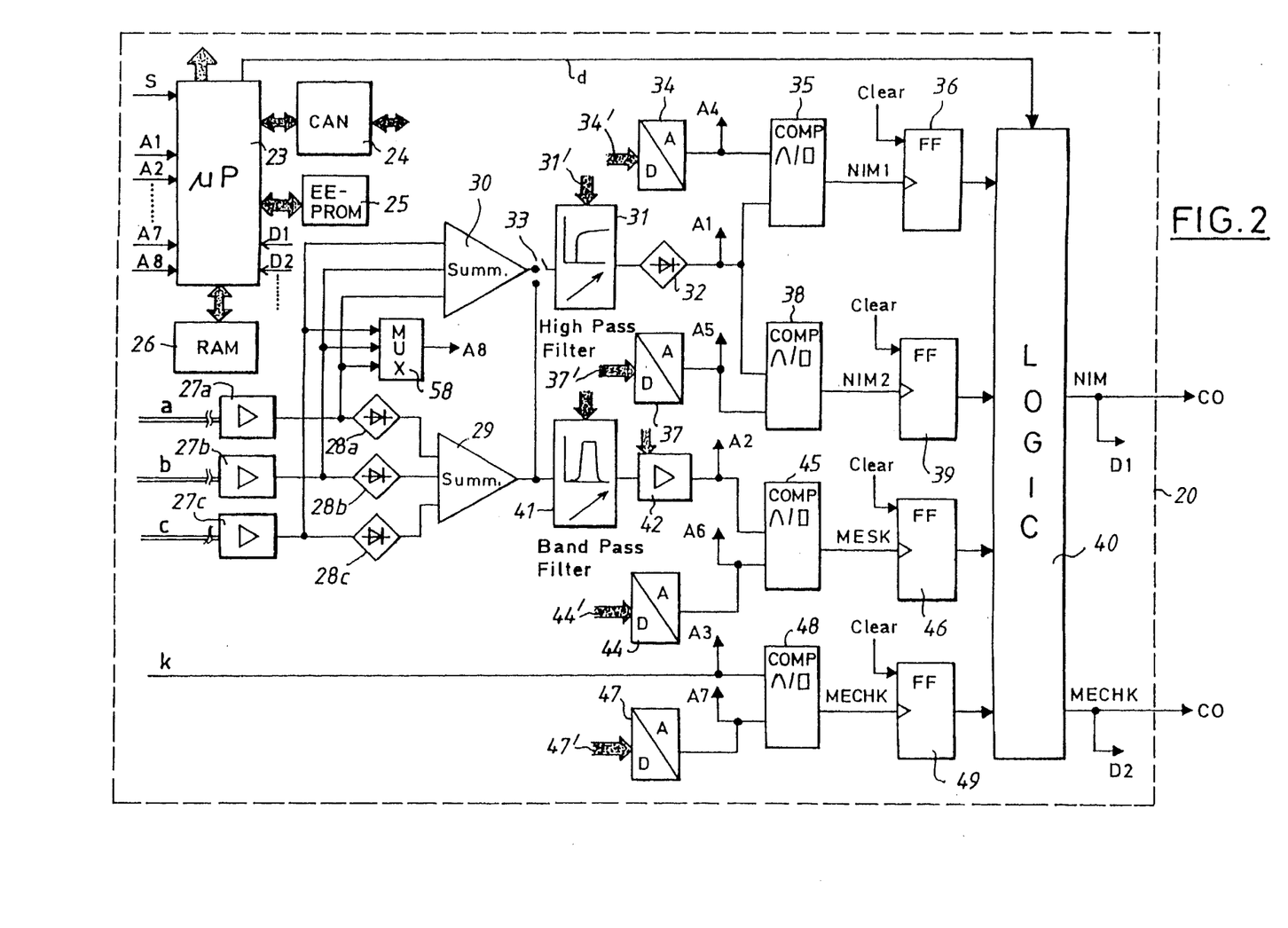
FIG. 2 is a block diagram of the electronic system 20 of FIG. 1 for processing probe signals.

FIG. 2 provides more detail of circuitry of the probe-head electronic system 20, wherein the signal-line pairs a, b, and c, are fed to three input amplifiers 27a, b and c, on the circuit board of the probe-head electronic system 20. Outputs of these amplifiers are in each case connected to a rectifier 28a, 28b and 28c and at the same time to a multiplexer (MUX) 58 as well as to a summation component 30. The summation component 30 combines the three signals produced by the piezoelectric sensors 18a–c to develop a sum signal, of amplitude relatively independent of the direction of workpiece-contacting. This sum signal is fed via a switch 33 to a high-pass filter 31. This high-pass filter is a microprocessor-controlled switched-capacitance filter having a characteristic for which the lower-limit frequency can be digitally displaced by a microprocessor 23 which is also carried on the same circuit board; in FIG. 2, a heavily shaded arrow 31' will be understood to symbolize such microprocessor control of the frequency characteristic of the high-pass filter 31. The high-pass filter 31 can thus be adapted digitally to the frequency of the acoustic signal produced by the first probe contact with the workpiece. Such a filter is commercially available from MAXIM, Inc., 120 St. Gabriel Drive, Sunnyvale, Calif., USA under the name MAX 261.

The high-pass filter 31 is followed by a rectifier 32 which rectifies the filtered alternating voltage signal (acoustic signal). The rectified signal is fed to two comparators 35 and 38 having trigger thresholds controlled by digital/analog converters 34 and 37, respectively. As indicated by heavily shaded arrows 34', 37' on the D/A converters 34 and 37, trigger thresholds of comparators 35 and 38 are also set via the microprocessor 23.

In order to be able to recognize contacting processes as clearly as possible, the trigger threshold or level of comparator 35 is lower than that of comparator 38. Accordingly, the ascending flank of the probe signal produces, at the output of the comparators 35 and 38, two rectangular signals, following each other in time, on the signal lines NIM1 and NIM2. The two signals are fed, via a flip-flop 36, 39 for each signal, to a circuit 40, designated as "LOGIC", the function of which will be described with reference to FIG. 3.

Since the trigger levels of comparators 35 and 38 can be set independently of each other, both the sensitivity of probe-signal recognition and the distance in time between the two rectangular signals on the signal lines NIM1 and NIM2 can be set via the microprocessor 23.

The outputs of the three rectifiers 28a, 28b and 28c are fed to a summation component 29 which is followed by a band-pass filter 41. This band-pass filter is constructed in exactly the same manner as the high-pass filter 31 and is adjustable with respect to its filter characteristic, i.e., the position of the two cutoff frequencies, and also digitally by the microprocessor 23. The band-pass filter 41 is followed by an amplifier 42 of adjustable amplification which compensates (a) for changes in signal intensity in the course of shifting the band-pass filter or (b) for signal quality when selecting other cutoff frequencies. Again, heavily shaded arrows 41' and 42' in FIG. 2 are symbolic of filter and amplifier settings controlled by microprocessor 23.

Since the band-pass filter 41 is set to relatively low frequencies, the output of amplifier 42 is a signal which characterizes relatively slow change of forces acting on the piezoelectric sensors 18a–c and thus on the probe ball 16. If this signal exceeds a level which is compared in comparator 45 with the output signal of another digital/analog converter 44, then the comparator 45 produces a so-called "measurement force signal", designated MESK, which indicates that the force acting on the probe ball has reached a value such as typically occurs upon application of the probe ball 16 on a workpiece. This signal MESK is also fed via a flip-flop 46 to the logic circuit 40.

The switch signal k derived from the electromechanical switch contacts 13/14 is fed on the circuit board of the probe-head electronic system 20 directly to a comparator 48 the level of which is also adjustable, again via a digital/analog converter 47, having a microprocessor (23) controlled adjustment suggested at 47'. A displacement of the trigger threshold is used to automatically compensate for changes in resistance of the contact point, due to aging or burning which otherwise would in an extreme case falsely indicate a continuously open contact. For this purpose, signal line k is connected via measurement point A3 with an analog input of the microprocessor which cyclically interrogates a residual-voltage-dependent offset voltage on the signal line k and adjusts the trigger threshold of comparator 48 accordingly, via digital/analog computer 47. For the purpose of acknowledgment, the trigger input of comparator 48 is also connected via a measurement point A7 to an analog input of the microprocessor 23.

The output of comparator 48 delivers a signal designated MECHK, which characterizes the instant of time when probe 15 forces its carrier 12a/12b to lift off the three-point bearing 13/14. And this output signal is also fed to the logic circuit 40 via a flip-flop 49.

Information with regard to parameters to be set, i.e., the values for limiting frequencies of the high-pass filter 31 and of the band-pass filter 41, as well as the trigger threshold levels of comparators 35, 38, 45 and 48, are received by the microprocessor 23 via a CAN-bus 24 from control means 21 of the CMM or indirectly via the IEEE-bus from computer 22. The parameters to be set are stored by the microprocessor in an EEprom 25, so that set values are retained, even in the event of a power failure or a shut-down of the machine.

Figure 3:
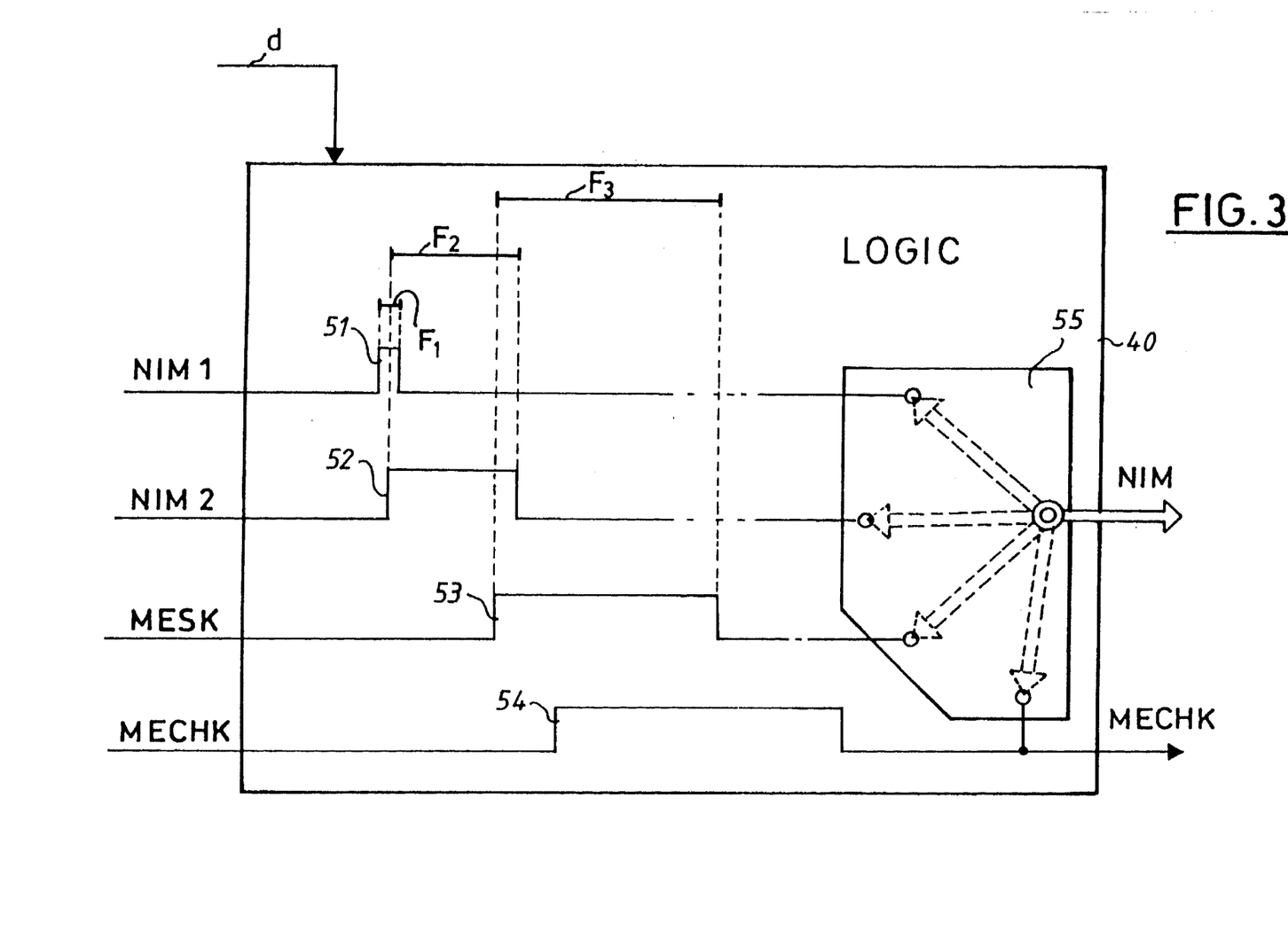
FIG. 3 is a simplified diagram to show the course of signals in logic part 40 of the electronic system of FIG. 2.

In the logic circuit 40, which can be constructed in the manner of a programmable logic array, or from discrete NAND gates, or the function of which can be developed in firmware of microprocessor 23, time windows F1, F2, and F3 are set within which, in each case, a signal NIM1 generated by the first and slightest workpiece contact must be followed by signals NIM2, MESK and MECHK, if the first workpiece contact is to be recognized as valid. For this purpose, (a) the pulse duration of the signal NIM1 is set within the logic circuit 40 to a relatively short value, typically 100 μsec; (b) a window F2, i.e., the pulse duration of the signal NIM2, is set to an average value of about 15 msec; and (c) another time window F3, i.e., the pulse duration of the signal MESK, is set to a longer value, typically 200 msec. And a mode switch 55 enables selection of different modes of operation for control by microprocessor 23.

First Mode of Operation

A "valid" workpiece-contact event is recognized only if all four signals NIM1, NIM2, MESK and MECHK have developed such that (a) the rectangular pulse 52 on signal line NIM2 has occurred during at least a portion of the rectangular pulse 51 on signal line NIM1, (b) the rectangular pulse 53 on signal line MESK has occurred during at least a portion of the pulse 52 on signal line NIM2, and (c) the rectangular pulse 54 on signal line MECHK has occurred during at least a portion of the rectangular pulse 53 on signal line MESK, i.e., within windows limits F1, F2 and F3 set by the microprocessor. In this first mode of operation, the time of contact is generated with utmost precision and dependability since the multiple evaluation effectively suppresses disturbances and minimizes dependence upon the pulse 51 on signal line NIM1; the pulse 51 is produced from a very small acoustic output, but it reliably represents the instant of very first contact between probe ball 16 and the workpiece.

Second Mode of Operation

For an evaluation of the instant of workpiece contact pursuant to this second mode, only the three signals NIM2, MESK and MECHK are used, and the signal NIM1 is dispensed with. The contacting is recognized as valid when the two signals 53 and 54 on signal lines MESK and MECHK follow the pulse 52 on signal line NIM2 within the time windows F2 and F3, described for operation of the first mode. By dispensing with the very first probe pulse 51 obtained with low trigger threshold, the instant of contact is, admittedly, not as precisely established; but, on the other hand, the circuit is less susceptible to disturbance since noise pulses of low signal level are kept away from the contact signal.

Third Mode of Operation

Only the pulses 53 and 54 on the two signal lines MESK and MECHK are evaluated for the contact signal. The pulse 54 must follow the pulse 53 within window F3. With this third mode of operation, the application pressure of the probe ball 16 on the workpiece generates the contact signal, which provides very high security against noise. The instant of workpiece contact determined thereby is, however, even later than in the case of the second mode of operation, although, to be sure, the exact contact time can be determined by extrapolation for given contact speeds. The use of this third mode of operation is recommended in particular when environmental influences, for example, a high noise level, could result in intensive noise signals on the signal lines a, b and c connected to the piezo elements, or in the case of dirty or soft workpieces which do not provide a sufficiently strong piezoelectric signal, i.e., preferably in all cases in which the signal/noise ratio on these signal lines is poor.

Fourth Mode of Operation

Measurement is effected by using only a signal 54 on signal line MECHKA. This signal 54 is switched via the operating-mode switch 55 to the signal line designated NIM. A contact signal is thus generated only when probe-pin carrier 12a/12b lifts off its three-point bearing 13/14. This fourth mode of operation supplies relatively inaccurate measurement results and as a rule is required only in the following cases: in defective operation, i.e., when the signal lines a, b and c do not provide a usable signal because of a defect, for instance in setup operation, i.e., when, upon the programming and testing of the CNC program, the points on the workpiece which are to be contacted are to be covered as rapidly as possible, or in the case of a so-called parameter orientation run in which the parameters which are to be optimally set are determined as described above only over one or more trial runs on the workpiece.

In the logic component 40, the time windows F1, F2 and F3 can be set under digital control by microprocessor 23, as the same is schematically indicated by signal line d; the signal line d is also to be understood as indicating that mode selection via switch 55 may also be under control of microprocessor 23. In the latter situation, it is necessary to reset the time windows to other values, particularly when it is desired to operate with a different contacting speed, either in order to reduce the time required by the measurement or, in the case of soft workpieces, because a stronger "impact" is then needed between the probe ball and the workpiece in order to obtain a contact signal at all. In this connection, the times within which the signal pulses 51–54 follow each other for a "valid" contact are shortened. Time windows optimal for contacting speed can be placed in a data file, as for example together with other parameters, such as the trigger threshold levels of the comparators 35, 38, 45, 48, and assorted cut-off frequencies for the high-pass filter 31 and for the band-pass filter 41; to this end, the data file may be connected to or with the setting for speed or, in accordance with a further development of the invention, the contacting speed itself can be included as a further parameter in the data file to be called up for a given measurement task. Since optimal contacting speed depends on the material of the probe ball 16 and on the material of the workpiece to be measured, it is also possible to manage data files having sets of parameters for processing the probe signal, for variations of the contact-speed parameter, in data files which are created and stored with reference to the kind of workpiece or the kind of material of the workpiece.

One manner of parameter switching which is particularly advantageous for automated runs consists in associating data files having stored values for the different parameters with the different probe pins or probe configurations to be interchanged. In FIGS. 5, 5A, 5B and 5C, for example, four entirely different probe configurations are shown, namely:

A. a standard probe 61 (FIG. 5) which can be used for many measurement tasks, having a length of about 60-mm and a diameter of about 8-mm;

B. a very long star-shaped probe 62 (FIG. 5A) with which the inside of gear housings, for example, may be measured;

C. a heavy special probe 63 (FIG. 5B) which consists of a plurality of individual probes with which probing must be effected in different workpiece geometries; and D. a light, thin probe 64 (FIG. 5C) for measuring more filigreed parts.

Figure 5:
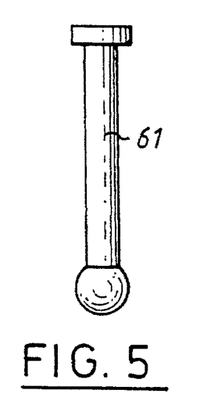
FIG. 5 is a view in elevation of a "standard" interchangeable probe pin, for which the invention provides one or more different associated parameter-data files.
Figure 5A:
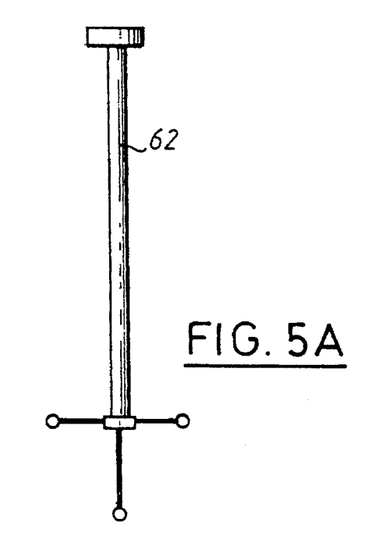
FIG. 5A is a similar view for a so-called "long probe" that is also interchangeable in place of the standard probe of FIG. 5 and for which the invention provides one or more different associated parameter-data files.
Figure 5B:
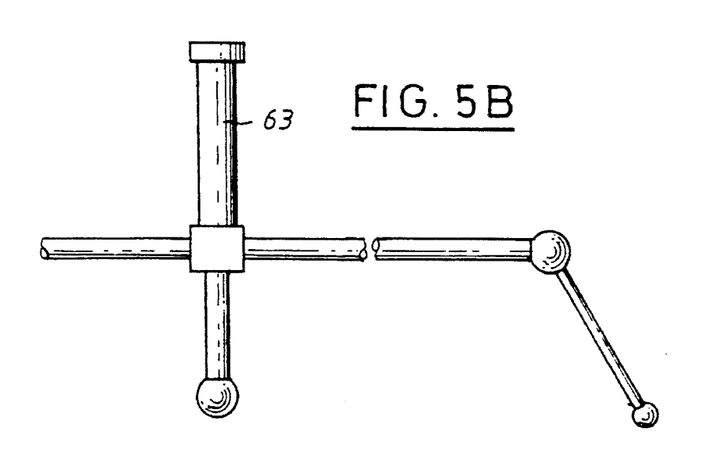
FIG. 5B is a similar view for another interchangeable probe device, of so-called "heavy-probe" variety, and for which the invention provides one or more different associated parameter-data files.
Figure 5C:
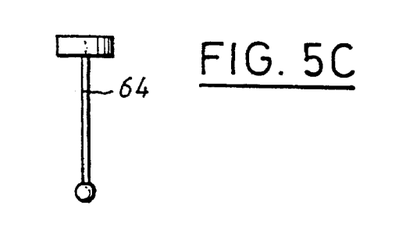
FIG. 5C is a further similar view for another interchangeable probe device, of so-called "light-probe" variety, and for which the invention provides one or more different associated parameter-data files.

The variety of probe configurations represented in FIGS. 5 to 5C, necessarily entails a range of parameter values which are different, from one to the next-selected probe. Thus, for example, acoustic travel times will differ as a function of probe length; compliant bending of the probe will be a function of probe length and diameter; and there will be different frequencies of natural resonance of the various probe configurations. And contact signals produced with the probes will differ from each other in intensity, frequency spectrum, signal form, etc.

Figure 6:
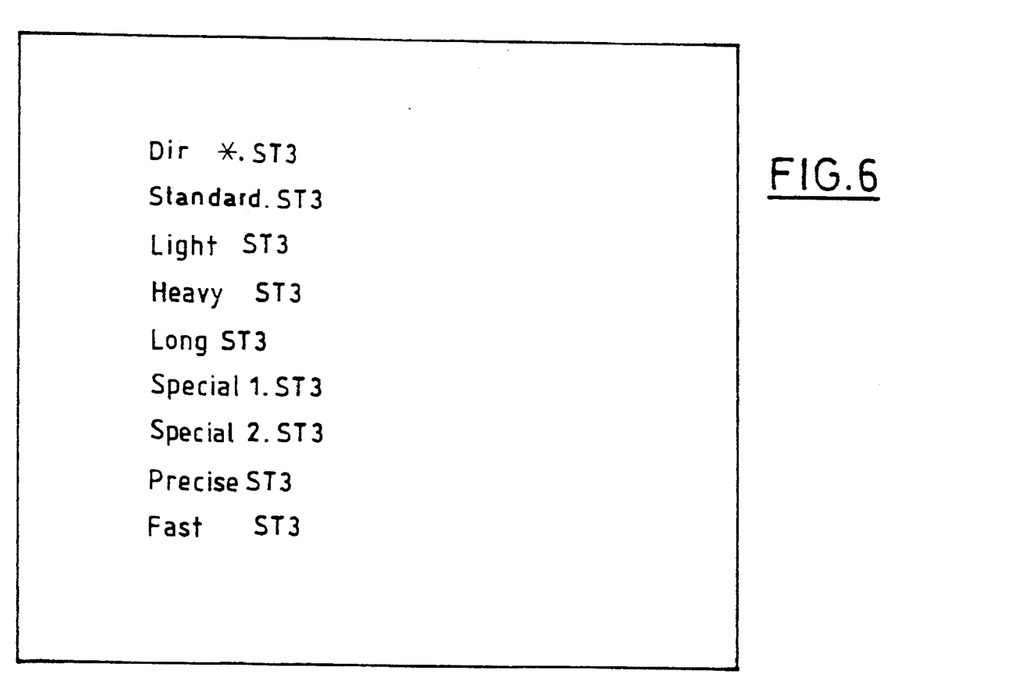
FIG. 6 is another computer-displayed menu for set-up selection pursuant to the invention, providing for operator selection of different parameter-data files, for selective association with various of the interchangeable probe devices, illustratively represented by the probes of FIGS. 5, 5A, 5B and 5C.

Therefore, the optimal parameter combinations for probes to be interchanged need be set only once in one or more different data files and stored, for example, for retrieval from computer 22. FIG. 6 shows an illustrative computer-displayable menu listing of various probe parameter data files stored in computer 22, all of which have the extension ST3. Among these data files, in addition to those which are associated with the probes 61 to 64, there are also files which optimize a selected one of two modes of operation, namely, "precise" measurement and "fast" measurement, as well as two data files "Special 1" and "Special 2" for special measurement tasks such as, for example, the measurement of plasticine or wax models.

Figure 4:
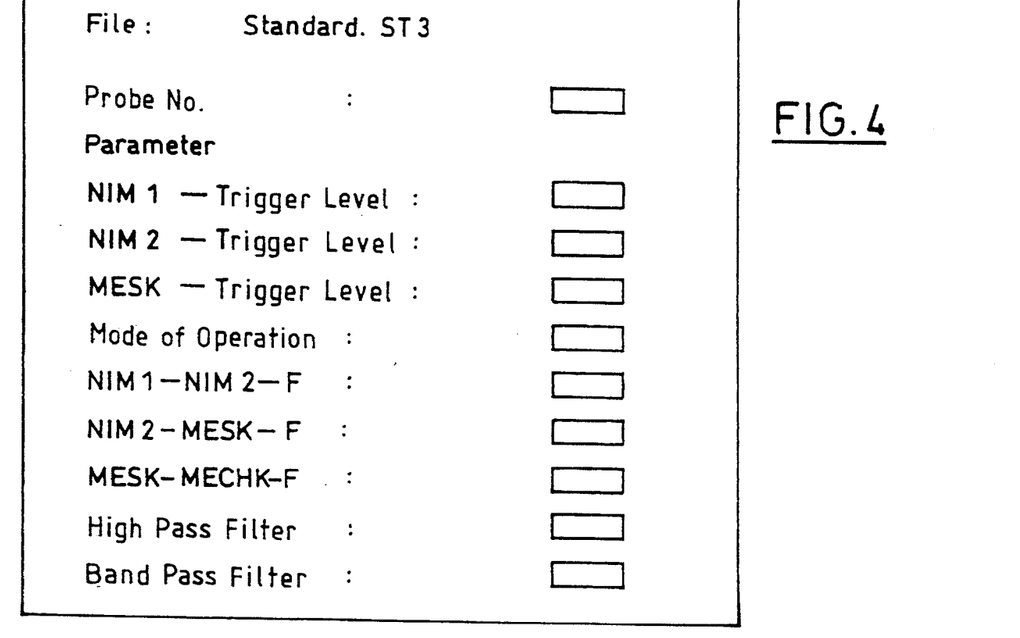
FIG. 4 is a computer-displayed menu list of the different parameters which can be set in the electronic system 20 of FIGS. 1 and 2.

The parameters contained in the data files served by menus as in FIG. 6 are the same for all data files and are set forth, by way of example, in FIG. 4 for the data file "Standard ST3", e.g., the probe 61 of FIG. 5. Thus, FIG. 4 may be a computer display of parameter data, values for which are entered in the blank boxes of the display, as applicable for a particular probe, e.g., the number 61 being entered in the "Probe No." box of FIG. 4. In this connection, it is also possible to associate a given probe with each data file, the probe number being enterable in the data file.

Changes can be made in any data file, and the nine parameters listed (or possibly still-further parameters) can be set to the values optimally adapted to the measurement task. The first three parameters are concerned with trigger levels to be set for the comparators 35, 38 and 45; these can be set via the digital converters 34, 37 and 44. In the case of "Mode of Operation", one is concerned with a selectable one of the four modes of operation which have been explained with reference to FIG. 3. In the case of the next three parameters, one is concerned with the window or pulse lengths, designated F1 to F3 in FIG. 3, of the signals 51, 52 and 53 on the lines NIM1 and NIM2 and MESK, as well as with the lower cutoff frequency of high-pass filter 31 and the middle frequency of band-pass filter 44.

The values to be entered in the boxes alongside the respective parameters can be empirical values which are entered manually therein upon establishing the data file. In addition, however, it is also possible to have the parameters automatically determined and set, as stated in the preamble to this specification, by means of a software or firmware module.

By connecting each of the data files of FIG. 6 with one or more probe addresses, the data files listed in FIG. 6 are automatically called up upon a probe change, and the parameters entered therein are transferred via the CAN-bus to the microprocessor 23, which sets the corresponding values for the components on the probe-head electronic system 20 of FIG. 2.

It is also possible to relate the setting of the different parameters even more strongly to the probe or probe head to be introduced, in such manner that the data files containing the parameters are not stored in the computer 22, but rather are contained in the firmware of the microprocessor 23; the selection of data files can then be effected directly on the basis of-the code transmitted by the code reader 62 via the signal line S to microprocessor 23 (FIG. 1).

As can be noted from FIG. 2, tap points A1 to A8 are provided at various places on the circuit board of the probe-head electronic system, at which points the different forms of the probe signal can be taken off and fed to corresponding analog inputs of microprocessor 23. The latter stores the course in time of the signals at these tapping points in a random-access memory 26 (RAM). Therefore, for each work-contact procedure, a two-dimensional data field arises in which the different tapped signals are held in timed relationship to each other until the next cycle of workpiece-contact procedure. The same takes place with the signals on signal lines NIM and MECHK, which are tapped off the logic circuit 40 at points designated D1 and D2 and applied to corresponding digital inputs of microprocessor 23.

The content of RAM 26 can be transmitted over CAN-bus 24 to the computer 22, which stores these signal courses on a diskette, for example as documentation for different contact points along the entire course of measurement. Similarly, it is possible in this way to analyze stored signal courses for subsequent optimizing. For this purpose, the signal courses can be remotely transmitted by the computer 22 via a data interface and a connected model so that the analysis of the signal courses can be effected at the manufacturer, if measurement problems are encountered by the customer and user of the coordinate measurement machine.

By means of the modem, parameter data files which are set up specifically for the customer can then also be transmitted to the computer 22 of the coordinate measurement machine. It may also be pointed here that the data interface need not necessarily be conducted via computer 22 but that, for example, a data interface may also be connected directly to CAN-bus 24 so that the said model can then communicate with said data interface.

The probe-head electronic system 20 of FIG. 2 has been shown and described for a so-called switching probe head. However, it will be understood that the invention can also be used in combination with measuring probe heads in which analog signals proportional to the deflection of the probe pin are produced. These signals can then, in a corresponding probe-head electronic system be differently amplified, filtered and subjected to logic connections appropriate to the applicable measurement task, in the same way as the contact signal of the switching probe shown in FIG. 1 is appropriate to its measurement task. It is likewise possible also to treat the signal of a so-called quartz oscillation probe corresponding to the measurement task in accordance with different criteria or with different parameter values set in the signal processing electronic system 20. Such a quartz oscillation probe is described, for instance, in German Gebrauchsmuster G 92 13 060.7.

We claim:

1. A coordinate-measurement machine having one or more probe heads (10) with associated replaceable probes (15, 61 to 64) and an electronic system (20) for processing probe signals (a, b, c, k) produced in the course of a work-probing procedure, wherein the electronic system (20) includes resettable means that permits parameters to be set to determine the manner and nature of signal processing, the parameters being set digitally, a plurality of data files for storage of a plurality of different sets of parameter values, and means for calling up a selected set of values of different parameters stored in a data file (*.ST3) to reset said resettable means in accordance with a selected measurement task.

2. A coordinate-measurement machine according to claim 1, in which the data files (*.ST3) are associated with a plurality of selected probe pins (61 to 64), and the values of the parameters stored in the corresponding data file (*.ST3) can be set upon workpiece contact with the corresponding probe pin (61 to 64).

3. A coordinate-measurement machine according to claim 2, in which an identification code (61) is associated with the replaceable probes to be introduced, and in which the selection of the corresponding parameter data file is effected under the control of the code.

4. A coordinate-measurement machine according to claim 1, in which the data files (*.ST3) are associated with selected types of machine operation within the capability of the coordinate-measurement machine, and are activated upon a change in the type of machine operation, the values of the stored parameters being set for operation of the coordinate-measurement machine upon making such a change in machine operation.

5. A coordinate-measurement machine according to claim 1, in which the electronic system includes a digitally encoded analysis program for analysis of the course of a probe signal at different points in the probe-pin electronic system and for setting parameters in accordance with the analysis.

6. A coordinate-measurement machine according to claim 1, in which the electronic system includes a digitally encoded module which sets different parameter combinations during a trial run in which a workpiece is contacted several times and which sets the parameters in accordance with the measurement results thereby obtained.

7. A coordinate-measurement machine according to claim 1, in which the machine includes a computer and in which the electronic system (20) is connected via a serial bus (CAN) to control means (21), the control means (21) being connected to the computer (22) of the coordinate-measurement machine.

8. A coordinate-measurement machine according to claim 1, in which the electronic system contains a microprocessor having several analog inputs (A1 to A8) which are respectively connected with different points (A1 to A8) within the electronic system for probe-signal processing, and that the course in time of the probe signals occurring during a work-contacting procedure at the analog-input points (A1 to A8) are stored in a memory component (RAM 26) of the microprocessor (23).

9. A coordinate-measurement machine according to claim 8, in which the electronic system (20) includes means for connecting the electronic system to a modem over which stored signal courses (A1 to A8) can be remotely transmitted.

10. A coordinate-measurement machine according to claim 8, including means for serial-bus (CAN) transmission of signal courses stored in the memory component (RAM 26) of the microprocessor.

11. A coordinate-measurement machine according to claim 1, in which the values of the parameters set by the electronic system (20) are stored in a random-access memory (25).

12. A coordinate-measurement machine according to claim 1, in which the probe head supplies at least two different contact signals (a, b, c, k), and the electronic system concurrently processes each of the at least two signals (a, b, c) in parallel in separate signal branches (N1M1, N1M2, MESK).

13. A coordinate-measurement machine according to claim 1, in which the machine includes a computer (22), and in which the electronic system (20) is connected via a serial bus directly to the computer (22) of the coordinate-measurement machine.

14. A coordinate-measurement machine according to claim 1, in which the data files (*.ST3) are associated with a plurality of selected probe configurations, and the values of the parameters stored in the corresponding data file (*.ST3) are set upon workpiece contact with the selected probe configuration.

15. A coordinate-measurement machine according to claim 1, in which the data files (*.ST3) are associated with a plurality of selected different types of probe heads, and the values of the parameters stored in the corresponding data file (*.ST3) can be set upon workpiece-contact involvement of a selected probe head.

16. A coordinate-measurement machine according to claim 1, in which the data files (*.ST3) are associated with different measurement tasks, and are activated upon a change in measurement task, the values of the stored parameters being set for operation of the coordinate-measuring machine upon making a change in measurement task.

17. A coordinate-measurement machine according to claim 1, in which the machine includes a computer and in which the electronic system (20) is connected via a serial interface to control means (21), the control means (21) being connected to the computer (22) of the coordinate-measurement machine.

18. A method for coordinate-measurement on workpieces using a probe head (i) adapted for interchangeable use of a selected one of a plurality of associated replaceable probes (61 to 64) and (ii) having an electronic system (20) for processing signals (a, b, c, k) produced upon probe contact with a workpiece, (iii) wherein the electronic system permits the resetting of at least two different parameters which determine the nature and manner of signal processing, and further wherein for specific measurement tasks and for each selectable probe, particularly suitable sets of parameter values are determined and the thus-determined sets of parameter values are stored in different data files;

the corresponding data files are called up upon a change in measurement task, and the applicable stored set of parameter values is loaded into the electronic system to reset parameter values therein; and signal-processing then proceeds for the changed measurement task using the newly loaded set of parameter values.

19. A method according to claim 18, in which different measurement tasks are selected in accordance with at least one of the following criteria:

the speed of measurement, the relative accuracy of measurement to be obtained, and the type or material of the object to be measured.

20. A method according to claim 18, in which at least two of the following parameters can be set:

the sensitivity of an amplifier (37) for the probe signal;

the characteristics of a frequency filter (31, 41) for the probe signal;

the threshold level of a trigger circuit (35, 38, 45, 48) for the probe signals;

the permissible duration (F1, F2, F3) of the probe signal;

the permissible timing of several interrelated probe-signal pulses (51 to 54);

the selection as to which of several probe signals (51 to 54) is to be further processed (mode of operation).

21. A method according to claim 20, in which the frequency filter is a band-pass filter in the form of a switched-capacitance filter having a microprocessor connection.

22. A method according to claim 20, in which the frequency filter is a high-pass filter in the form of a switched-capacitance filter having a microprocessor connection.

23. A method according to claim 18, in which the loading of sets of parameter values and the setting of said values in the electronic system takes place automatically in accordance with a program-controlled analysis of the probe signal obtained in the course of a workpiece-contacting procedure.

24. A method according to claim 18 in which, for the selection of optimal parameters, several contacting procedures with different parameters are performed in a test run.

25. A method according to claim 18, in which the loading and setting of sets of parameter values in the electronic system takes place automatically, pursuant to and controlled by a change of probe head.

26. A method according to claim 18, in which, for the selection of optimal parameters, several contacting procedures with different combinations of parameters are performed in a test run.

27. A method according to claim 18, in which the loading and setting of sets of parameter values in the electronic system takes place automatically, pursuant to and controlled by a change of probe pin.

28. A method according to claim 18, in which the loading and setting of sets of parameter values in the electronic system takes place automatically, pursuant to and controlled by a change of probe combination.

29. A coordinate-measuring machine, comprising:

a computer;

probe means including means for producing a probe signal in the course of a work-probing procedure;

signal-processing electronics for processing said probe signal, said electronics being connected to said signal-producing means and comprising means for setting at least two different parameters determining the manner and nature of processing said signal;

setting means for digitally setting said parameters to predetermined values;

one or more data files stored in said computer, each data file containing a set of values for said at least two different parameters; and means for calling up from said computer a selected one of said data files and forwarding the set of values contained therein to said setting means.

30. A coordinate-measuring machine, comprising:

a computer;

probe means with means for mounting exchangeable probe pins of differing type, and means for producing a probe signal when one of said probe pins touches a workpiece;

signal-processing means for processing said probe signal, said signal-processing means being connected to said signal-producing means and comprising means for setting at least two different parameters determining the manner and nature of processing said probe signal according to the type of probe pin mounted to said probe means;

setting means for digitally setting said parameters to predetermined values;

one or more data files stored in said computer, each data file containing a set of values for said at least two different parameters; and means for calling up a selected one of said data files and for forwarding the set of values contained therein to said setting means.

31. A method for coordinate-measurement on workpieces using a probe head adapted for interchangeable use of a selected one of a plurality of associated replaceable probes and being connected to an electronic signal-processing system for processing signals produced upon probe contact with a workpiece, wherein the electronic system permits the setting of at least two different parameters, said method comprising the steps of:

creating at least two different data files, each data file containing a set of at least two different parameter values which determine the nature and manner of processing said signals;

storing said data files;

calling up a selected one of said data files, and loading the set of parameter values contained therein into said electronic system, thereby resetting said different parameters to the parameter values contained in the selected data file; and using the newly loaded set of parameter values in the processing of one or more signals produced upon probe contact with the workpiece.

32. A method for coordinate-measurement on workpieces using a probe head adapted for interchangeable use of a selected one of a plurality of associated replaceable probes and being connected to an electronic signal-processing system for processing signals produced upon probe contact with a workpiece, wherein the electronic system permits the resetting of at least two different parameters, said method comprising the steps of:

creating at least two different data files, each data file containing a set of at least two different parameter values which determine the nature and manner of processing said signals according to a selected one of several different measurement tasks;

storing said data files;

selecting one of the different measurement tasks;

calling up the selected one of said data files and loading the set of parameter values contained therein into said electronic system, thereby resetting said different parameters to the parameter values contained in said selected data file; and processing said signals during performance of the selected measurement task using the newly loaded set of parameter values.

* * * * *